June 30, 1959   E. J. ILL   2,892,360
ADJUSTABLE DRIVE MECHANISM
Filed March 19, 1957   2 Sheets-Sheet 1
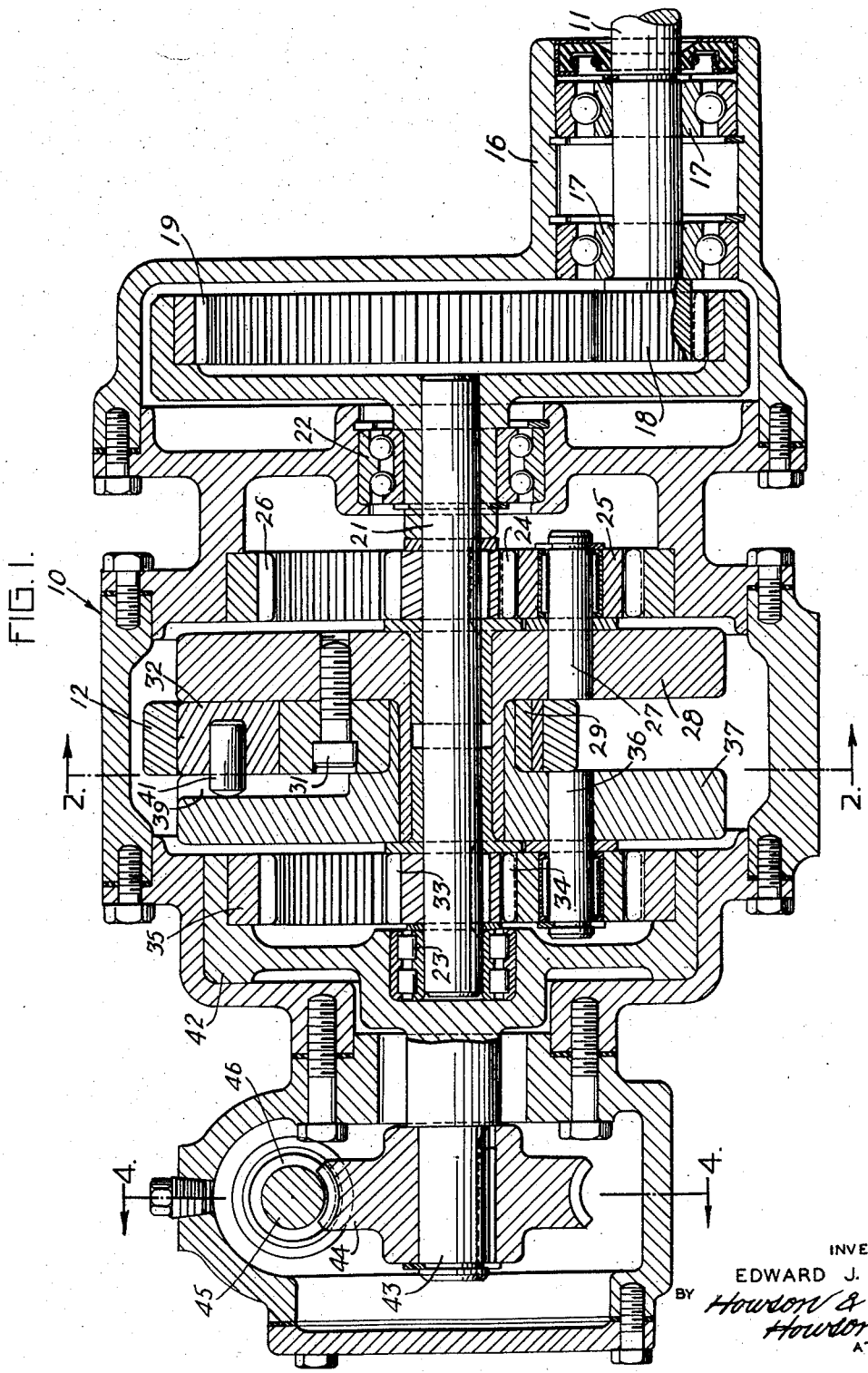
INVENTOR:
EDWARD J. ILL
BY Howson &
Howson
ATTYS.

June 30, 1959  E. J. ILL  2,892,360
ADJUSTABLE DRIVE MECHANISM
Filed March 19, 1957  2 Sheets-Sheet 2
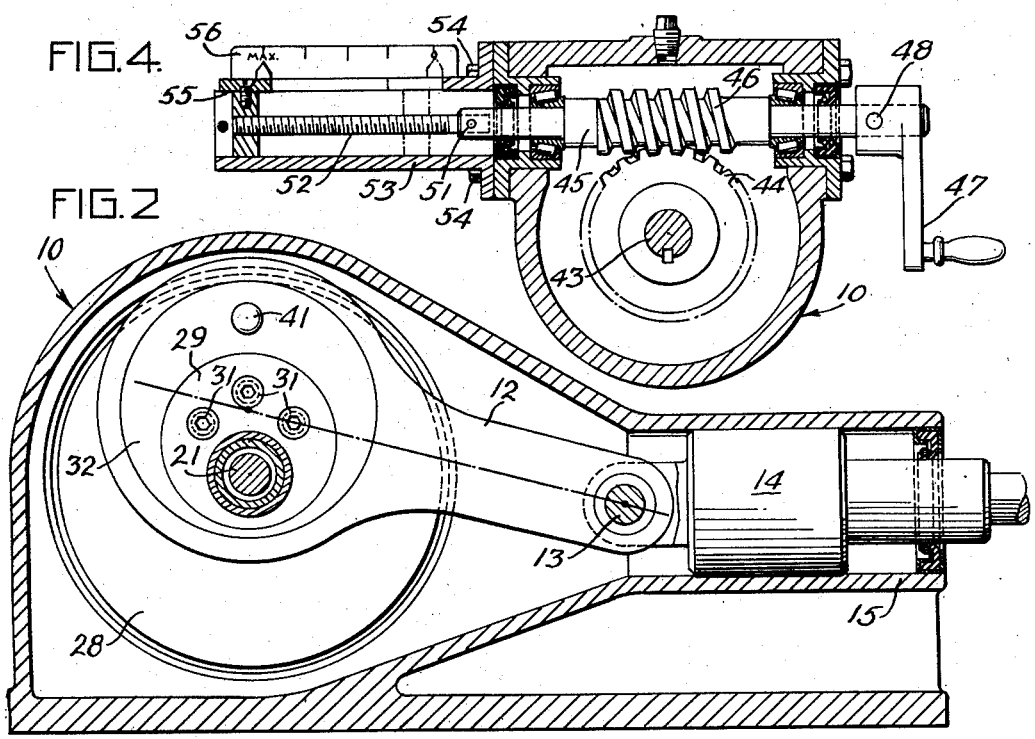
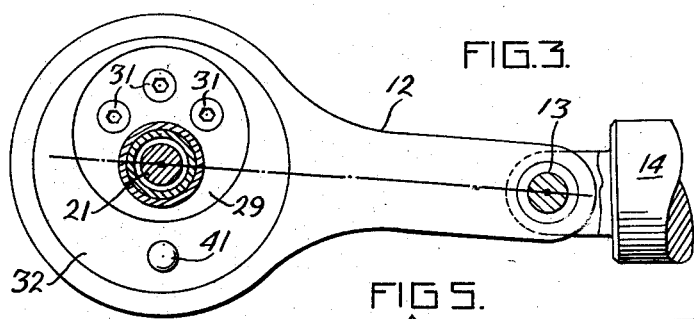
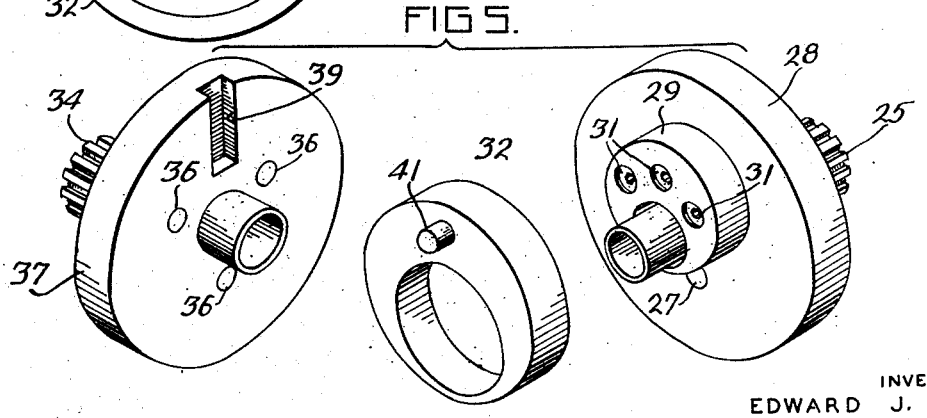
INVENTOR:
EDWARD J. ILL
BY Howson & Howson
ATTYS.

United States Patent Office 2,892,360
Patented June 30, 1959

2,892,360
ADJUSTABLE DRIVE MECHANISM

Edward J. Ill, Strafford, Pa., assignor, by mesne assignments, to Wallace & Tiernan Incorporated, Belleville, N.J., a corporation of Delaware Application March 19, 1957, Serial No. 647,100

13 Claims. (Cl. 74—571)

The present invention relates to new and useful improvements in adjustable drive mechanisms and more particularly to new and useful improvements in adjustable drive mechanisms for adjusting the length of stroke of a piston rod for a pump or the like during operation of the pump.

The adjustable drive mechanism of the present invention is specifically designed for use with reciprocating type proportioning pumps to vary the output of the proportioning pump without a change of speed of the pump and solely by changing the stroke length. By changing only the stroke length, it is possible to provide a positive and accurate means for changing the displacement of the pump and adjusting the rate of delivery of the pump, regardless of the pressure against which the pump is operating. In addition, the adjustable drive mechanism of the present invention is designed primarily for high output pumps and for pumps which are operated at extremely high liquid pressures.

With the foregoing in mind, the principal object of the present invention is to provide novel adjustable drive mechanism for a pump or the like which is operable to transmit a high torque from the pump drive motor to the pump.

Another object of the present invention is to provide a novel adjustable drive mechanism operable to vary the stroke of a pump or similar equipment from a zero stroke to a maximum length of stroke without changing the speed of the pump.

A further object of the present invention is to provide novel adjustable drive mechanism for reciprocating proportioning pumps and the like in which the output of the pump may be varied while the pump is in operation and wherein a specified pump output may be obtained within very close tolerance limits.

A still further object of the present invention is to provide novel adjustable drive mechanism having the various features and characteristics set forth above which is of relatively simplified construction, may be manufactured easily and cheaply, and is entirely efficient and effective in operation and use.

These and other objects of the present invention and the various features and details of the operation and construction thereof are hereinafter more fully set forth and described with reference to the accompanying drawings, in which:

Fig. 1 is a longitudinal sectional view through the adjustable drive mechanism of the present invention;

Fig. 2 is a transverse sectional view of the adjustable drive mechanism taken on the line 2—2, Fig. 1, with the drive mechanism connected to a reciprocating piston rod for a pump;

Fig. 3 is a fragmentary sectional view similar to Fig. 2 illustrating the adjustable drive mechanism adjusted to provide a zero stroke length for the pump;

Fig. 4 is a transverse sectional view taken on line 4—4, Fig. 1 illustrating the means for adjusting the position of the adjustable drive mechanism of the present invention to vary the stroke length of the pump and illustrating one form of indicator which may be used to indicate the stroke length of the pump;

Fig. 5 is an exploded perspective view of the inner and outer cams and the drive wheels for the cams.

Referring more specifically to the drawings and particularly Fig. 1 thereof, reference numeral 10 designates generally a housing containing the various elements of the adjustable drive mechanism of the present invention. The drive mechanism is operable to receive power from a continuously rotating input drive shaft 11 and transmit the power to a connecting rod 12 which in turn is interconnected as indicated at 13 to a crosshead 14 mounted for reciprocating movement in a slide 15 formed at the forward end of the housing 10. The crosshead 14 in turn may be connected to the piston rod of a pump or the like (not shown) to transmit reciprocating movement to the pump plunger.

As illustrated in Fig. 1, the drive shaft 11 projects interiorly of the housing 10 through a boss 16 formed integrally with the housing 10 and is supported by bearings 17, 17. A pinion 18 is fixed to the inner end of the drive shaft 11 and is mounted in engagement with an internal ring gear 19 which, in turn, is fixed to a stub shaft 21 extending longitudinally of the central portion of the housing 10. The stub shaft 21 is mounted for rotary movement within the housing 10 and is supported by bearings 22 and 23 at its opposite ends.

Fixed to the stub shaft adjacent the bearing 22 is a drive sun gear 24 which is mounted in engagement with a drive planetary gear 25. The planetary gear 25 in turn engages a stationary ring gear 26 carried by the housing 10 and during rotation of the stub shaft 21, the drive planetary 25 is driven at a uniform sped in an orbital path about the axis of the stub shaft 21. The drive planetary 25 is carried by a stud 27 projecting outwardly from one face of a drive spider 28. An inner eccentric 29 is bolted to the drive spider 28, as indicated at 31, and the inner eccentric 29 is positioned eccentrically about the stub shaft 21 with the longitudinal axis of the inner eccentric 29 spaced a predetermined distance from the axis of the stub shaft 21. By this construction, during rotation of the stub shaft 21 the inner eccentric 29 will be caused to rotate at a uniform predetermined rate of speed about the axis of the stub shaft 26.

In accordance with the present invention, an outer eccentric 32 is positioned about the inner eccentric 29 and the eccentricity of the outer eccentric 32 relative to the stub shaft 21 is exactly the same as the eccentricity of the inner eccentric 29 relative to the stub shaft 21. The outer eccentric 32 is driven, as more fully described hereinafter, at the same rate of speed as the inner eccentric 29 and mounts, on its outer periphery, the connecting rod 12. Means are provided, however, to vary the relative position of the outer eccentric 32 with respect to the inner eccentric 29 so that the total eccentricity of the connecting rod relative to the stub shaft 21 may be varied thereby changing the length of stroke of the crosshead 14 and the pump or other mechanism which is connected to the crosshead 14. By rotating the eccentric 32 relative to the eccentric 29, the total eccentricity of the crosshead relative to the stub shaft may be varied from the maximum position as shown in Fig. 2 to the position shown in Fig. 3 wherein the connecting rod is positioned concentrically relative to the stub shaft 21 and wherein no movement is imparted to the connecting rod.

Rotation of the outer eccentric 32 is effected by means of a sun gear 33 fixed to the stub shaft 21 and mounted in engagement with a control planetary gear 34 which in turn engages an adjustable ring gear 35. The control planetary 34 is rotatably mounted on a stud 36 carried by an adjusting spider 37, and during rotation of the stub shaft 21, the control planetary 35 is driven in an orbital path about the axis of the stub shaft 21 at the same rate of speed as the drive planetary gear 25 and the adjusting spider 37 is rotatably driven at the same rate of speed as the drive spider 28. The adjusting spider 37 in turn drives the outer eccentric 32 by means of a slot 39 formed in the face of the adjusting spider 37 within which is engaged a pin 41 projecting outwardly from the outer eccentric 32. With this construction, the outer eccentric 32 is rotated about the axis of the stub shaft 21 at the same rate of speed as the inner eccentric 29 and the length of stroke of the crosshead 14 will be constant, depending upon the total eccentricity of the inner and outer eccentrics.

An important feature of the present invention is the provision of means to vary the position of the outer eccentric 32 relative to the inner eccentric 29 to thereby change the total eccentricity of the connecting rod relative to the stub shaft. This is accomplished, according to the present invention, by rotating the adjustable ring gear 35 about the axis of the stub shaft 21 thereby causing the control planetary 34 to be moved arcuately relative to the drive planetary 25 and rotate the outer eccentric 32 relative to the inner eccentric 31. The adjustable ring gear 35 is fixed within a control spindle 42 which is rotatably mounted within the housing 10 and supports the bearings 23 carrying the left hand end of the stub shaft 21, relative to Fig. 1.

The control spindle 42 has a shaft 43 formed integrally therewith which carries a worm gear 44. Positioned above the worm gear 44 and rotatably mounted within the housing 10 is a worm shaft 45 having a worm 46 formed thereon in engagement with the worm gear 44. Rotation of the worm 46 will cause the worm gear 44, control spindle 42 and adjustable ring gear 35 to be rotated relative to the stub shaft thereby changing the eccentricity of the outer eccentric 32 relative to the inner eccentric 29, as set forth previously.

The worm gear 36 may be rotated manually by means of a handle 47 secured to the outer end of the worm shaft 45 outwardly of the housing 10, as illustrated at 48. The opposite end of the worm shaft 45 projects outwardly through the opposite side of the housing 10 and is pinned, as indicated at 51, to a threaded shaft 52 extending longitudinally of a slide 53 bolted to the housing 10 as indicated at 54. The threaded shaft 52 carries an indicator 55 thereon which is mounted for sliding movement within the slide 53. A dial 56, positioned above the slide 53 and supported thereby, is associated with the indicator 55 and is graduated to indicate the total amount of eccentricity of the inner and outer eccentrics 32 and 29, or, if desired, any function of the total eccentricity, such as the volume output of the pump or other piece of equipment driven by the connecting rod 12. Upon rotation of the worm shaft 45 the position of the indicator 55 relative to the dial 56 is changed along with the change in eccentricity of the connecting rod 12 relative to the stub shaft 21.

During normal operation of the adjustable drive mechanism of the present invention the control spindle 42 is restrained from rotation about its axis by means of the worm and worm gear as the ratio of the worm to the worm gear is such that rotation of the worm will cause the worm gear to rotate but rotation of the worm gear cannot cause the worm to rotate. This provides an adjustable lock for the control spindle to prevent inadvertent rotation of the control spindle. However, the control spindle may be rotated by causing rotation of the worm during operation of the adjustable drive mechanism of the present invention, thereby permitting adjustment of the length of stroke of the crosshead during operation of the adjustable drive mechanism.

From the foregoing it will be apparent that the present invention provides novel adjustable drive mechanism for pumps and the like which is operable to transmit a high torque from the pump drive motor to the pump and which is operable to permit variation of the stroke of the pump from a zero length to a maximum length without changing the speed of the pump. In addition, it will be apparent that the present invention provides novel adjustable drive mechanism having these features set forth above in which the stroke of the pump or other article connected to the drive mechanism may be varied while the drive mechanism is in operation in order to obtain a specified output from the pump or other article connected to the drive mechanism.

While a particular embodiment of the present invention has been illustrated and described herein, it will be apparent that many variations may be made to this adjustable drive mechanism without departing from the present invention, and it is not intended to limit the invention to such a disclosure but changes and modifications may be incorporated and embodied therein within the scope of the following claims.

I claim:

1. Adjustable drive means operable to provide reciprocating motion to a member comprising; a driven shaft, a first eccentric eccentrically mounted relative to said driven shaft, a second eccentric eccentrically mounted relative to said driven shaft and interconnected with said first eccentric, separate drive means interconnecting said driven shaft with said first and said second eccentrics operable to rotate the same about said driven shaft at the same rate of speed, a connecting rod interconnected with said eccentrics and said member operable to reciprocate said member upon rotary movement of said eccentrics, and means interconnecting one of said eccentrics and said drive means for said one eccentric operable to cause rotation of said one eccentric relative to said other eccentric to vary the total eccentricity imparted to said connecting rod and correspondingly vary the stroke of said member.

2. Adjustable drive means operable to provide reciprocating motion to a member comprising; a driven shaft, an inner eccentric eccentrically mounted relative to said driven shaft, an outer eccentric eccentrically mounted about said driven shaft on said inner eccentric, separate drive means interconnecting said driven shaft with said inner and said outer eccentrics operable to rotate the same about said driven shaft at the same rate of speed, a connecting rod mounted about said outer eccentric interconnected with said member operable to reciprocate said member upon rotary movement of said inner and outer eccentrics, and means interconnecting one of said eccentrics and the drive means for said one eccentric operable to cause rotation of said one eccentric relative to said other eccentric to vary the total eccentricity imparted to said connecting rod and correspondingly vary the stroke of said member.

3. Adjustable drive means operable to provide reciprocating motion to a member comprising; a driven shaft, a first eccentric eccentrically mounted relative to said driven shaft, first drive means operable to drive said first eccentric about said driven shaft at a predetermined rate of speed, a second eccentric eccentrically mounted relative to said driven shaft and interconnected with said first eccentric, second drive means interconnecting said driven shaft with said second eccentric operable to rotate the same about said driven shaft at said predetermined rate of speed, a connecting rod interconnected with said eccentrics and said member operable to reciprocate said member upon rotary movement of said first and second eccentrics, and means interconnecting said second eccentric and said second drive means operable to cause rotation of said second eccentric relative to said first eccentric to vary the total eccentricity imparted to said connecting rod and correspondingly vary the stroke of said member.

4. Apparatus in accordance with claim 3 wherein the driven means for said second eccentric comprises a planetary gear system consisting of a sun gear, a planetary gear and a ring gear, one of said gears being drivably connected to said driven shaft, another of said gears being drivably connected with said second eccentric and operable to cause rotation of said second eccentric, the third of said gears being normally maintained stationary, and means operable to rotate said third gear to thereby cause rotation of said second eccentric relative to said first eccentric.

5. Adjustable drive means operable to provide reciprocating motion to a member comprising; a driven shaft, an inner eccentric eccentrically mounted relative to said driven shaft, first drive means interconnecting said driven shaft and said inner eccentric operable to rotate said inner eccentric about said driven shaft at a predetermined rate of speed, a second eccentric eccentrically mounted relative to said driven shaft positioned about said inner eccentric, second drive means interconnecting said driven shaft with said outer eccentric operable to rotate said outer eccentric about said driven shaft at said predetermined rate of speed and in the same direction as the direction of rotation of said inner eccentric, a connecting rod mounted about said outer eccentric and interconnected with said member operable to reciprocate said member upon rotary movement of said outer and inner eccentrics, and means interconnecting one of said eccentrics with its associated drive means operable to cause rotation of said one eccentric relative to said other eccentric to vary the total eccentricity imparted to said connecting rod and correspondingly vary the stroke of said member.

6. Apparatus in accordance with claim 5 wherein the drive means for one of said eccentrics comprises a planetary gear system consisting of a sun gear, a planetary gear and a ring gear, one of said gears being drivably connected to said driven shaft, another of said gears being drivably connected with said one eccentric and operable to cause rotation of said one eccentric, the third of said gears being normally maintained stationary, and means operable to rotate said third gear to cause rotation of said one eccentric relative to said other eccentric to vary the total eccentricity imparted to said connecting rod.

7. Adjustable drive means operable to provide reciprocating motion to a member comprising; a driven shaft, a first eccentric eccentrically mounted relative to said driven shaft, first drive means interconnected with said driven shaft operable to drive said first eccentric about said driven shaft at a predetermined rate of speed, a second eccentric eccentrically mounted relative to said driven shaft and interconnected with said first eccentric, a drive spider mounted for rotary movement about said driven shaft and drivably connected with said second eccentric, a gear train interconnecting said driven shaft and said drive spider operable to cause rotary movement of said drive spider and said second eccentric in the same direction and at the same rate of speed as said first eccentric, and means interconnected with said gear train operable to vary the rate of speed said gear train drives said second eccentric to cause rotation of said drive spider and said second eccentric relative to said first eccentric to vary the total eccentricity of said first and second eccentrics.

8. Apparatus in accordance with claim 7 wherein said driving connection between said drive spider and said second eccentric comprises a slot and pin connection with the slot extending radially relative to said driven shaft.

9. Adjustable drive means operable to provide a reciprocating motion to a member comprising; a housing, a drive shaft mounted within said housing for rotary movement, an inner eccentric mounted eccentrically about the axis of said drive shaft, drive means interconnecting said drive shaft and said inner eccentric operable to rotate said inner eccentric in one direction at a predetermined rate of speed, an outer eccentric mounted eccentrically relative to said inner eccentric, a drive spider mounted for rotary movement about said drive shaft and drivably connected with said outer eccentric, a planetary gear train interconnecting said drive shaft and said drive spider comprising a sun gear, planet gear and ring gear, one of the gears of said gear train being fixed to said drive shaft and rotatable therewith, a control spindle mounted within said housing for rotary movement about the axis of said drive shaft, another gear of said gear train being fixed to said control spindle, the third gear of said gear train being drivably interconnected with said drive spider and operable to rotate said drive spider and said outer eccentric in the same direction and at the same rate of speed as said inner eccentric, a connecting rod drivably interconnected with said outer eccentric and said member operable to impart reciprocating motion to said member, and drive means for said control spindle to rotate said control spindle about the axis of said drive shaft to thereby cause rotation of said outer eccentric relative to said inner eccentric to change the total eccentricity imparted to said connecting rod.

10. Apparatus according to claim 9 wherein said control spindle drive means comprises a worm gear fixed to said control spindle and a rotatable worm mounted in engagement with said worm gear.

11. Apparatus according to claim 9 wherein said sun gear is mounted on said drive shaft for rotary movement therewith, said ring gear is fixed to said control spindle and rotatable therewith, and said planetary gear is positioned in engagement with said sun gear and said ring gear for orbital movement about said sun gear and is drivably connected to said drive spider.

12. Apparatus in accordance with claim 1 wherein a housing is provided for said driven shaft, said eccentrics and the means interconnecting said one eccentric and the drive means, and wherein a member is provided in engagement with said means interconnecting one of said eccentrics and the drive means, said member being normally stationary relative to said housing, and means to move said member relative to said housing to cause rotation of said one eccentric relative to said other eccentric.

13. Adjustable drive means operable to provide reciprocating motion to a member comprising; a housing, a driven shaft, a first eccentric eccentrically mounted within said housing for rotation about said driven shaft, a second eccentric eccentrically mounted within said housing for rotation about said driven shaft, said second eccentric being interconnected with said first eccentric, a connecting rod interconnected with said eccentrics and said member operable to reciprocate said member upon rotary movement of said eccentrics, separate drive means interconnecting said driven shaft with said first and second eccentrics operable to rotate the same about said driven shaft at the same rate of speed, the drive means for one of said eccentrics comprising a planetary gear system consisting of a sun gear, a planetary gear and a ring gear positioned within said housing, one of said gears being drivably connected to said driven shaft, another of said gears being drivably connected with said one eccentric and operable to cause rotation of said one eccentric, the third of said gears being normally maintained stationary relative to said housing, and means including a member carried by said housing operable to rotate said third gear to cause rotation of said one eccentric relative to the other eccentric to vary the total eccentricity imparted to said connecting rod and correspondingly vary the stroke of said member.

References Cited in the file of this patent

UNITED STATES PATENTS 2,592,237     Bradley ---------------- Apr. 8, 1952
2,767,588     Drury ----------------- Oct. 23, 1956

UNITED STATES PATENT OFFICE

CERTIFICATE OF CORRECTION

Patent No. 2,892,360                                   June 30, 1959

Edward J. Ill

It is hereby certified that error appears in the above numbered patent requiring correction and that the said Letters Patent should read as corrected below.

In the grant, lines 2 and 3, and line 12, and in the heading to the printed specification, line 4, name of assignee, for "Wallace & Tierman Incorporated", each occurrence, read -- Wallace & Tiernan Incorporated --.

Signed and sealed this 8th day of December 1959.

(SEAL)
Attest:

KARL H. AXLINE                                     ROBERT C. WATSON
Attesting Officer                                 Commissioner of Patents